(12) United States Patent
Hill

(10) Patent No.: US 8,235,725 B1
(45) Date of Patent: *Aug. 7, 2012

(54) COMPUTERIZED METHOD OF ASSESSING CONSUMER REACTION TO A BUSINESS STIMULUS EMPLOYING FACIAL CODING

(75) Inventor: Daniel Hill, St. Paul, MN (US)

(73) Assignee: Sensory Logic, Inc., Minneapolis, MN (US)

( * ) Notice: Subject to any disclaimer, the term of this patent is extended or adjusted under 35 U.S.C. 154(b) by 397 days.

This patent is subject to a terminal disclaimer.

(21) Appl. No.: 11/062,424

(22) Filed: Feb. 20, 2005

(51) Int. Cl.
*G06Q 10/00* (2012.01)

(52) U.S. Cl. .......................... 434/236; 705/10

(58) Field of Classification Search ............. 345/8, 158, 345/419, 420, 423, 440, 473; 351/210; 358/527; 382/103, 107, 118, 128, 181, 189, 190, 224, 382/227, 236, 276, 305, 350; 434/236, 262, 434/322, 350, 323, 353; 463/17, 25, 29; 600/21, 26, 27, 300, 301, 383, 407, 408, 600/410, 459, 484, 515, 544, 545, 546, 547, 600/554; 700/17, 83, 264; 702/187; 704/251, 704/256, 270, 275; 705/3, 7, 10, 35, 546, 705/547; 706/46, 52; 707/1, 2, 4, 102; 713/600; 715/526, 530, 700, 774, 863; 703/12; 340/5.83; 375/240.08

See application file for complete search history.

(56) References Cited

U.S. PATENT DOCUMENTS

| | | | |
|---|---|---|---|
| 3,034,500 A | 5/1962 | Backster, Jr. | |
| 3,548,806 A | 12/1970 | Fisher | |
| 3,870,034 A | 3/1975 | James | |
| 4,448,203 A | 5/1984 | Williamson et al. | |
| 4,627,818 A | 12/1986 | Von Fellenberg | |

(Continued)

FOREIGN PATENT DOCUMENTS

JP 08115367 A 5/1996

(Continued)

OTHER PUBLICATIONS

Ekman, P. & Friesen, W.V., Unmasking The Face, A Guide to Recognizing Emotions from Facial Clues, 1979.

(Continued)

*Primary Examiner* — Xuan Thai
*Assistant Examiner* — Alvin Carlos
(74) *Attorney, Agent, or Firm* — Schwegman, Lundberg & Woessner, P.A.

(57) ABSTRACT

A computerized method of assessing an individual's reaction to a business stimulus. The method involves (a) visually recording facial expressions of a human subject as the subject is exposed to a business stimulus so as to generate a chronological sequence of recorded facial images; (b) automatically detecting and recording expressional repositioning of each of a plurality of selected facial features by conducting a computerized comparison of the facial position of each selected facial feature through sequential facial images, (c) automatically coding contemporaneously detected and recorded expressional repositionings to at least one of an action unit, one or more emotions, or a combination of an affiliation value and a motivation value, and (d) reporting a tally of at least one of the coded action units, coded emotions or coded combination of an affiliation value and a motivation value over a given time period along with an identification of the business stimulus to which the subject was exposed during that given time period.

41 Claims, 1 Drawing Sheet

U.S. PATENT DOCUMENTS

| | | | |
|---|---|---|---|
| 4,794,533 A | 12/1988 | Cohen | |
| 4,807,642 A | 2/1989 | Brown | |
| 4,817,628 A | 4/1989 | Zealear et al. | |
| 4,859,050 A | 8/1989 | Borah et al. | |
| 4,964,411 A | 10/1990 | Johnson et al. | |
| 4,975,960 A | 12/1990 | Petajan | |
| 5,031,228 A * | 7/1991 | Lu | 382/227 |
| 5,084,819 A | 1/1992 | Dewey et al. | |
| 5,092,343 A | 3/1992 | Spitzer et al. | |
| 5,124,911 A | 6/1992 | Sack | |
| 5,148,477 A * | 9/1992 | Neely et al. | 382/107 |
| 5,164,992 A * | 11/1992 | Turk et al. | 382/118 |
| 5,219,322 A | 6/1993 | Weathers | |
| 5,247,938 A | 9/1993 | Silverstein et al. | |
| 5,436,830 A | 7/1995 | Zaltman | |
| 5,607,186 A * | 3/1997 | Schroeder et al. | 283/65 |
| 5,663,900 A | 9/1997 | Bhandari et al. | |
| 5,676,138 A | 10/1997 | Zawilinski | |
| 5,710,833 A * | 1/1998 | Moghaddam et al. | 382/228 |
| 5,725,472 A | 3/1998 | Weathers | |
| 5,741,217 A | 4/1998 | Gero | |
| 5,772,591 A | 6/1998 | Cram | |
| 5,774,357 A * | 6/1998 | Hoffberg et al. | 713/600 |
| 5,774,591 A | 6/1998 | Black et al. | |
| 5,802,208 A | 9/1998 | Podilchuk et al. | |
| 5,802,220 A | 9/1998 | Black et al. | |
| 5,871,211 A | 2/1999 | Was | |
| 5,875,108 A * | 2/1999 | Hoffberg et al. | 700/17 |
| 5,901,244 A * | 5/1999 | Souma et al. | 382/190 |
| 6,004,312 A | 12/1999 | Finneran et al. | |
| 6,008,817 A | 12/1999 | Gilmore, Jr. | |
| 6,009,210 A * | 12/1999 | Kang | 382/276 |
| 6,026,321 A | 2/2000 | Miyata et al. | |
| 6,026,322 A | 2/2000 | Korenman et al. | |
| 6,088,040 A | 7/2000 | Oda et al. | |
| 6,099,319 A * | 8/2000 | Zaltman et al. | 434/236 |
| 6,185,534 B1 * | 2/2001 | Breese et al. | 704/270 |
| 6,222,939 B1 | 4/2001 | Wiskott et al. | |
| 6,272,231 B1 | 8/2001 | Maurer et al. | |
| 6,292,575 B1 * | 9/2001 | Bortolussi et al. | 382/118 |
| 6,301,370 B1 | 10/2001 | Steffens et al. | |
| 6,309,342 B1 | 10/2001 | Blazey et al. | |
| 6,311,190 B1 * | 10/2001 | Bayer et al. | 707/104.1 |
| 6,345,109 B1 * | 2/2002 | Souma et al. | 382/118 |
| 6,356,659 B1 | 3/2002 | Wiskott et al. | |
| 6,422,999 B1 * | 7/2002 | Hill | 600/300 |
| 6,443,840 B2 | 9/2002 | Von Kohorn | |
| 6,453,194 B1 * | 9/2002 | Hill | 600/546 |
| 6,466,695 B1 | 10/2002 | Potzsch et al. | |
| 6,533,583 B1 * | 3/2003 | Sportelli | 434/118 |
| 6,563,950 B1 | 5/2003 | Wiskott et al. | |
| 6,580,811 B2 | 6/2003 | Maurer et al. | |
| 6,611,613 B1 * | 8/2003 | Kang et al. | 382/118 |
| 6,681,032 B2 * | 1/2004 | Bortolussi et al. | 382/118 |
| 6,714,661 B2 | 3/2004 | Buddenmeier et al. | |
| 6,879,709 B2 * | 4/2005 | Tian et al. | 382/118 |
| 7,003,139 B2 * | 2/2006 | Endrikhovski et al. | 382/118 |
| 7,113,916 B1 * | 9/2006 | Hill | 705/7.32 |
| 7,120,880 B1 * | 10/2006 | Dryer et al. | 715/863 |
| 7,227,976 B1 | 6/2007 | Jung et al. | |
| 7,233,684 B2 * | 6/2007 | Fedorovskaya et al. | 382/118 |
| 7,246,081 B2 * | 7/2007 | Hill | 705/7.32 |
| 2002/0108125 A1 * | 8/2002 | Joao | 725/139 |
| 2003/0032890 A1 | 2/2003 | Hazlett et al. | |
| 2003/0093784 A1 | 5/2003 | Dimitrova et al. | |
| 2003/0133599 A1 * | 7/2003 | Tian et al. | 382/118 |
| 2003/0156304 A1 * | 8/2003 | Fedorovskaya et al. | 358/527 |
| 2003/0165269 A1 * | 9/2003 | Fedorovskaya et al. | 382/189 |
| 2003/0165270 A1 * | 9/2003 | Endrikhovski et al. | 382/189 |
| 2004/0001616 A1 | 1/2004 | Gutta et al. | |
| 2004/0101212 A1 * | 5/2004 | Fedorovskaya et al. | 382/305 |
| 2005/0031744 A1 | 2/2005 | Paliyath et al. | |
| 2005/0079474 A1 * | 4/2005 | Lowe | 434/236 |
| 2005/0131697 A1 | 6/2005 | Brown et al. | |
| 2005/0289582 A1 | 12/2005 | Tavares et al. | |
| 2007/0172155 A1 | 7/2007 | Guckenberger | |

FOREIGN PATENT DOCUMENTS

| | | |
|---|---|---|
| WO | WO 02/087443 A1 | 11/2002 |
| WO | WO 2004/091371 A2 | 11/2004 |

OTHER PUBLICATIONS

Ekman, P., "Facial Clues to Deceit," Telling Lies, Clues to Deceit in the Marketplace, Politics, and Marriage, p. 123-161, 1992.

Ekman, Paul et al., "Measuring Facial Movement," Environmental Psychology and Nonverbal Behavior, vol. 1, No. 1, p. 56-75, 1976.

Ekman, Paul, Friesen, W. V., Ancoli, S., "Facial Signs of Emotional Experience," Journal of Personality and Social Psychology, vol. 39, No. 6, p. 1125-1134, 1980.

http:/dataface.nirc.com/Expression/FACS/body_facs.html, Facial Affect Coding System, Jul. 9, 2001.

Sejnowski, T., Computational Neurobiology, http://www.salk.edu/faculty/sejnowski.html, Jul. 9, 2001, Table 11-1 Emotion Predictions, p. 138-139, undated.

Gallup & Robinson, Impact, "CERA—A new Sustem for Measuring Emotion in Advertising," 9:1, winter 2000, p. 1-2.

Bartlett, M.S., et al., "Measuring facial expressions by computer image analysis", Psychophysicology, 36 (1999), p. 253-263. Cambridge University Press.

Bassili, JN., "Emotion recognition: the role of facial movement and the relative importance of upper and lower areas of the face", Journal of Personality and Social Psychology 1979, vol. 37, No. 11, p. 2049, 2055.

Buam, K., et al., "Perception of Emotions: Measuring decoding accuracy of adult prosodic cues varying intensity", Summer 1998, Journal of Nonverbal Behavior, p. 89-108.

Chen, Qimei, et al., "Attitude toward the Site", Sep. 1999, Journal of Advertising Research, vol. 39, No. 5, p. 27.

Cohn, J., et al., "A Comparative Study of Alternative FACS Coding Algorithms", Tech. Report CMU-RI-TR-02-06, Robotics Institute, Carnegie Mellon University, Nov. 2001.

Derbaix, C., "The Impact of Affective Reactions on Attitudes toward the Advertisement and the Brand: A Step toward Ecological Validity", Journal of Marketing Research, vol. 32, No. 4 (Nov. 1995), pp. 470-479.

Ekman, P. & Friesen, W.V., "Manual for the Facial Action Coding System", 1978, 352 pages; Human Interaction Laboratory Department of Psychiatry, University of California.

Ekman, P., et al., "Report to NSF of the Planning Workshop on Facial Expression Understanding", National Science Foundation, Aug. 1, 1992.

Essa, I., et al., "Facial Expression Recognition using a Dynamic Model and Motion Energy" M.I.T. Media Laboratory Perceptual Computing Section Technical Report No. 307, Jun. 20-23, 1995, p. 1-8.

Frabotta, David, "Changing Focus", Feb. 21, 2000, Hotel & Motel Management, p. 1, 68.

Gordon-Murnane, Laura "Evaluating Net Evaluators", Feb. 1999, Searcher 7, 2, 57(1).

Hazlett, R., et al. "Emotional Response to Television Commercials: Facial EMG vs. Self-Report", Mar. 1999, Journal of Advertising Research, p. 7-23.

Izard, C., et al., "A System for Identifying Affect Expressions by Holistic Judgments (AFFEX)", Instructional Resources Center, University of Delaware, Newark, Delaware (1983).

Izard, C.E., "The Maximally Discriminative Facial Movement Cody System, (Rev. ed.)", Instructional Resources Center, University of Delaware, Newark, Delaware (1983).

Lee, C., et al., "Measuring Influence of the family decision making process using an observational method", 1998 Qualitative Market Research, p. 88-98.

Lien. J., et al., "A Multi-Method Approach for Discriminating Between Similar Facial Expressions, Including Expression Intensity Estimation", Proceedings of the IEEE Conference on Computer Vision and Pattern Recognition (CVRP '98), Jun. 1998.

Lien. J., et al., "Detection, Tracking, and Classification of Action Units in Facial Expression", Journal of Robotics and Autonomous Systems, Jul. 1999, p. 1-39.

Marcolin, et al., "Assessing User Competence: Conceptualization and Measurement", Information Systems Research. Linthicum: Mar. 2000, vol. 11, Issue 1, p. 37-60.

Tian, et al., "Recognizing action units for facial expression analysis", IEEE Transactions on Pattern Analysis and Machine Intelligence, vol. 23, No. 2, Feb. 2001, p. 97-115.

Hill, Daniel A.; "Facial Coding Analysis—Chapter 10"; Sensory Logic, Inc., 2002, pp. 151-179.

Hill, Daniel A., Emotiononics, earliest publication date of 2007, 274 pages.

Poels et al. "How to Capture the Heart? Reviewing 20 Years of Emotion Management in Advertising" Catholic University of Leuven, Department of Marketing and Organisation Studies, 2006, 48 pages.

Colmenarez, A. et al. "Embedded Face and Facial Expression Recognition." In Proceedings of ICIP (1). 1999, 633-637.

Colmenarez, A. et al. "A Probabilistic Framework for Embedded Face and Facial Expression Recognition." 1999, 1592-1597.

Van Kuilenburg et al. "A Model Based Method for Automatic Facial Expression Recognition" J. Gama et al. (Eds.): ECML 2005, LNAI 3720, pp. 194-205, 2005.

* cited by examiner

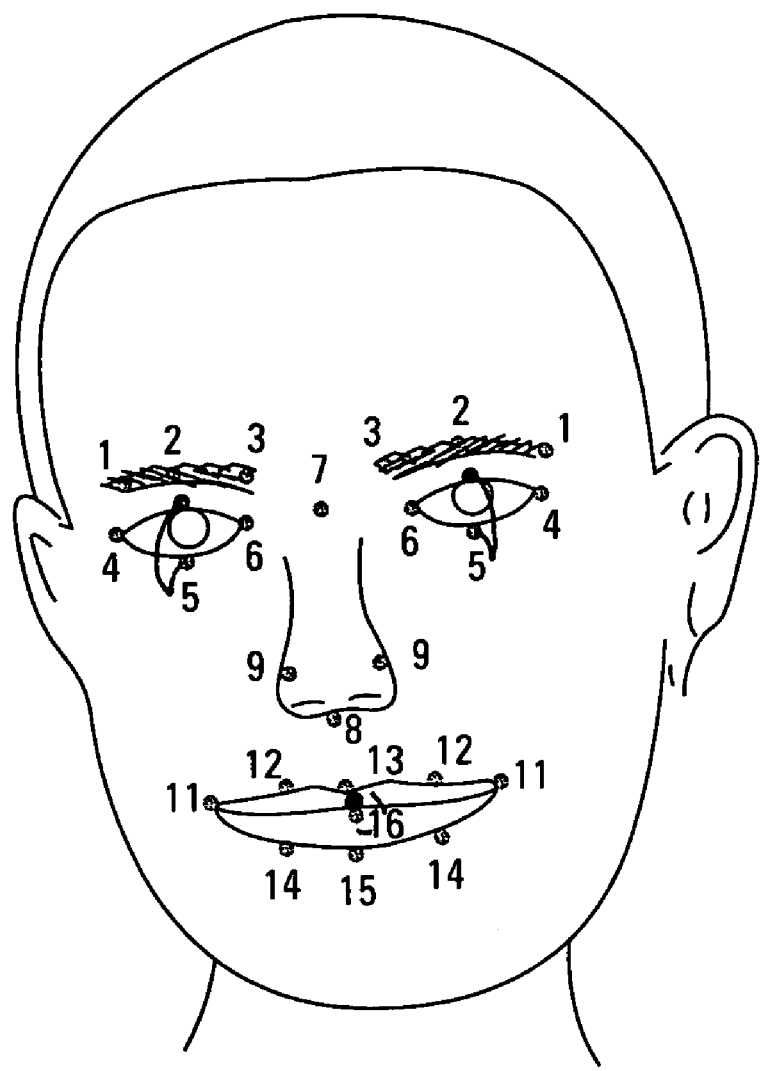

COMPUTERIZED METHOD OF ASSESSING CONSUMER REACTION TO A BUSINESS STIMULUS EMPLOYING FACIAL CODING

FIELD OF THE INVENTION

The invention relates to methods of measuring target audience reaction to business stimuli.

BACKGROUND

Facial behavior has typically been gauged by using either comprehensive facial measurements or selective facial measurements. Comprehensive facial measurements include open-ended observations of what is casually seen or direct measurements such as the Facial Action Coding System ("FACS") originally described in Ekman, P., Friesen, W. V., *Facial Action Coding System: A Technique for the Measurement of Facial Movement*, Consulting Psychologists Press, Palo Alto, Calif. (1978). Although direct comprehensive measurements are usually both time consuming and costly, they provide a much greater opportunity to discover unexpected facial action than does mere observation.

Selective facial measurements are used when the facial behavior is known in advance. The researcher must be aware of and attend only to the specific facial actions under investigation. These include selective observer judgments, or direct measurements such as (i) the Maximally Discriminative Facial Movement Coding System ('MAX") originally described in (i) Izard, C. E., *The Maximally Discriminative Facial Movement Coding System*, (Rev. ed.), Instructional Resources Center, University of Delaware, Newark, Del. (1983), (ii) the System for Identifying Affect Expression by Holistic Judgment ("AFFEX") originally described in Izard, C., Dougherty, L., Hembree, E. *A System for Identifying Affect Expressions by Holistic Judgments (AFFEX)*, Instructional Resources Center, University of Delaware, Newark, Del. (1983), (iii) the Emotion Facial Action Coding System ("EMFACS") originally described in Ekman, P., Friesen, W., Ancoli, S., *Facial Signs of Emotional Experience, Journal of Personality and Social Psychology*, vol. 39, No. 6, pp. 1125-1134 (1980), and (iv) Ekman, P., Friesen, W., *Measuring Facial Movement, Environmental Psychology and Nonverbal Behavior*, 1 (1), Fall 1976, pp. 56-75, and (v) facial electromyography ("EMG"). A major limitation inherent in measuring facial behavior selectively is that this approach does not usually separate emotional facial behavior from conversational facial behaviors, and certain behaviors characteristic of emotion are omitted. For example, only a limited number of the action units identified under the Emotion Facial Action Coding System ("EMFACS") (i.e., AUs 5, 6, 7, 9 and 12) are reasonably available for coding during speech.

Investigators have conducted significant research into the use of electronic facial tracking and measurement for various purposes. U.S. Pat. No. 4,975,960, issued to Petajan, discloses an electrical system for obtaining an electronic image of the mouth region in order to facilitate and augment the ability to monitor speech.

U.S. Pat. Nos. 5,774,591 and 5,802,220, issued to Black, disclose an electronic system for tracking human head and facial features over time to capture relative motions for purposes of ascertaining when a sequence of images defines a dominant facial expression. The system seeks a correspondence between predefined facial gestures and perceived facial expressions for the purpose of determining which gestures trigger or support which expressions. The system does not seek to ascertain the underlying emotional response of a participant to a stimulus.

U.S. Pat. No. 5,802,208, issued to Podilchuk et al., discloses an electronic system for obtaining and comparing an electronic image of a face for purposes of recognition.

U.S. Pat. No. 6,088,040, issued to Oda et al., discloses an input/output control mechanism for receiving facial image information related to different facial expressions and normalizing the facial image information for subsequent comparisons.

Facial tracking and measurement have not been applied in the field of company and marketing analysis. Consumer reaction to a marketing stimulus (e.g., a television commercial) is typically assessed by a written questionnaire or survey (commonly through the internet) or means of exposing participants to the marketing stimulus (e.g., having the focus group watch the commercial) and obtaining the reactions and comments of the members immediately after exposure to the marketing stimulus by means of a written questionnaire and/or a personal interview. Similarly, employee reaction to a company stimulus (e.g., presentation on planned change in the company's benefit plan) is typically assessed by using a similar survey or "focus group" technique. While generally effective, such techniques suffer from several drawbacks, including a tendency for survey individuals or members of a focus group to express inaccurately or imprecisely their reaction to the marketing stimulus.

Current marketing theory suggests most consumer-purchasing behavior and brand loyalty is dependent on the many facets of the consumer's sensory experiences and take-away impressions—not merely on rational decisions. Marketing efforts seek to match their offerings to the potential consumer's experiences, but lack a sophisticated technique to measure the emotional response or buy-in reaction of their products or services. Measurement of workforce acceptance and buy-in to business practices, including strategic initiatives, also suffer from an inability to measure true emotional response or buy-in.

Facial coding can be effectively used to ascertain a target audience's true sensory experiences and take-away impressions to marketing offerings and company related issues respectively, but is a slow, cumbersome and expensive method requiring the highly specialized skills of personnel trained and experienced in facial coding.

Hence, a longstanding need exists for a quick, reliable and inexpensive scientific technique and methodology for measuring a consumer's emotional reaction to marketing stimuli and an employee's reaction to company stimuli.

SUMMARY OF THE INVENTION

The invention is directed to a computerized method of assessing an individual's reaction to a business stimulus. The method involves (a) visually recording facial expressions of a human subject as the subject is exposed to a business stimulus so as to generate a chronological sequence of recorded facial images; (b) automatically detecting and recording expressional repositioning of each of a plurality of selected facial features by conducting a computerized comparison of the facial position of each selected facial feature through sequential facial images, (c) automatically coding contemporaneously detected and recorded expressional repositionings to at least one of an action unit, one or more emotions, or a combination of an affiliation value and a motivation value, and (d) reporting a tally of at least one of the coded action units, coded emotions or coded combination of an affiliation value and a motivation value over a given time period along with an identification of the business stimulus to which the subject was exposed during that given time period.

BRIEF DESCRIPTION OF THE DRAWINGS

FIG. 1 is a view of a human face indicating the location of several facial features which can be conveniently utilized in performance of the invention.

DETAILED DESCRIPTION OF THE INVENTION INCLUDING A BEST MODE

Definitions

As utilized herein, including the claims, the phrase "action unit," means contraction or other activity of a facial muscle or muscles that causes an observable movement of some portion of the face.

As utilized herein, including the claims, the term "affiliation," means to create or enhance the emotional connection to a company, company branded offering, and/or business practices. Affiliation can be generally understood in terms of promoting appeal, likeability and attraction to what is being offered.

As utilized herein, including the claims, the phrase "emotion," means any single expressional repositioning or contemporaneous combination of expressional repositionings correlated to a coded unit. The expressional repositionings which can be coded to Action Units and then translated to the various emotions, or directly coded to the various emotions, are set forth in Table Three herein. The emotions include anger, disgust, fear, happiness, sadness, and surprise as set forth in the Facial Action Coding System ("FACS"), and the additional divisions of "happiness" into the smile-related categories of joy, skepticism (a/k/a/false smile), micro-smile, true smile and social smile.

As utilized herein, including the claims, the term "coding to action units," means to correlate a detected single expressional repositioning or combination of contemporaneous expressional repositionings with a known single expressional repositioning or combination of contemporaneous expressional repositionings previously recognized as denoting a specific Action Unit whereby the detected single expressional repositioning or combination of contemporaneous expressional repositionings can be categorized as indicating the occurrence of that type of Action Unit. Types of action units utilized in the method of this invention, including those established by the Facial Action Coding System ("FACS"), are set forth below in Table One.

TABLE ONE

DESCRIPTION OF FACS SINGLE ACTION UNITS

| AU No. | FACS NAME | MUSCULAR BASIS |
|---|---|---|
| 1 | Inner Brow Raiser | Frontalis, Pars Medialis |
| 2 | Outer Brow Raiser | Frontalis, Pars Lateralis |
| 4 | Brow Lowerer | Depressor Glabellae; Depressor Supercilli; Corrugator |
| 5 | Upper Lid Raiser | Levator Palebrae Superioris |
| 6 | Cheek Raiser | Orbicularis Oculi, Pars Orbitalis |
| 7 | Lid Tightener | Orbicularis Oculi, Pars Palebrali |
| 9 | Nose Wrinkler | Levator Labii Superioris, Alaeque Nasi |
| 10 | Upper Lip Raiser | Levator Labii Superioris, Caput Infraorbitalis |

TABLE ONE-continued

DESCRIPTION OF FACS SINGLE ACTION UNITS

| AU No. | FACS NAME | MUSCULAR BASIS |
|---|---|---|
| 11 | Nasolabial Furrow Deepener | Zygomatic Minor |
| 12 | Lip Corner Puller | Zygomatic Major |
|  | 12U | Unilateral Zygomatic Major (e.g., one side of the face) |
|  | 12F | Bilateral Zygomatic Major (e.g., both sides of the face) |
| 14 | Dimpler | Buccinnator |
| 15 | Lip Corner Depressor | Triangularis |
| 16 | Lower Lip Depressor | Depressor Labii |
| 17 | Chin Raiser | Mentalis |
| 20 | Lip Stretcher | Risorius |
| 22 | Lip Funneler | Orbicularis Oris |
| 23 | Lip Tightener | Orbicularis Oris |
| 24 | Lip Pressor | Orbicularis Oris |
| 26 | Jaw Drop | Masetter; Temporal and Internal Pterygoid |
| 27 | Mouth Stretch | Ptergoids; Digastric |

As utilized herein, including the claims, the term "coding to emotions or weighted emotional values," means to correlate a detected single expressional repositioning or combination of contemporaneous expressional repositionings with a known single expressional repositioning or combination of contemporaneous expressional repositionings previously recognized as denoting one or more specific emotions whereby the detected single expressional repositioning or combination of contemporaneous expressional repositionings can be categorized as indicating the occurrence of those types of emotions. The emotion(s) coded from each detected single expressional repositioning or combination of contemporaneous expressional repositionings can optionally be weighted as an indication of the likely strength of the emotion and/or the possibility that the expressional repositioning was a "false" indicator of that emotion. Types of emotions well suited for use in practicing this invention are set forth below in Tables Four and Five.

As utilized herein, including the claims, the term "coding to an affiliation value and a motivation value," means to correlate a detected single expressional repositioning or combination of contemporaneous expressional repositionings with a known single expressional repositioning or combination of contemporaneous expressional repositionings previously recognized as denoting an affiliation value and a motivation value whereby the detected single expressional repositioning or combination of contemporaneous expressional repositionings can be categorized as indicating a level of affiliation and motivation.

As utilized herein, including the claims, the term "expose," means to submit or make accessible to one or more of the five senses of sight, hearing, taste, touch and smell. Exposure can be guided (e.g., access is managed, conducted and directed by a researcher serving as a guide) or unguided (e.g., access is left to the personal whims and fancy of the participant based upon how he/she naturally chooses to experience the stimulus). The unguided mode encompasses the ability to engage in self-directed observational recordings.

As utilized herein, including the claims, the phrase "expressional repositioning" means moving a facial feature on the surface of the face from a relaxed or rest position to a different position using a facial muscle, which movement is indicative of a facial expression.

As utilized herein, including the claims, the phrase "facial position" means location on the surface of the face relative to positionally stable facial features such as the bridge of the nose, the cheekbones, the crest of the helix on each ear, etc.

As utilized herein, including the claims, the term "interview," means to ask at least one question relating to a business stimulus to which a person has just been exposed. An interview may be conducted in any number of settings including seated face-to-face, while walking, while experiencing a product or retail offering or setting, in-home, remotely via the internet or by a mobile phone camera. etc.

As utilized herein, including the claims, the phrase "business stimulus," means both company stimulus and marketing stimulus.

As utilized herein, including the claims, the phrase "company stimulus," refers to an item pertaining to the governance, organization, management, structure, policies, procedures, work-place environment, etc. of a company. Exemplary company stimuli include announcements to employees, reporting obligations of employees, reaction to strategic goals and policies, bonus pay policy and procedure, type of work-stations, etc.

As utilized herein, including the claims, the phrase "marketing stimulus," refers to an item selected and designed to (i) advertise, promote and/or enhance the sales or acceptance of a product and/or service, (ii) advertise, promote, improve and/or enhance customer recognition and/or the public image of a person and/or business, (iii) position a product, and/or (iv) enhance brand identity. Exemplary marketing stimuli include, television commercials, radio advertisements, print advertisements, billboard advertisements, point-of-purchase displays, live inquiry such as questions regarding pricing, questions regarding attitudes and questions regarding purchasing preferences, store-front signage, packaging, Yellow Pages advertisements, brochures, literature used in mass mailings, web sites, individual web pages, store layouts, interior design of a store, product appearance, product operation, presentation materials, etc.

As utilized herein, including the claims, the term "illustration," includes graphs, charts, and data tables.

As utilized herein, including the claims, the phrase "same media," means within a single type of media, wherein types of media are separated as between (i) television, (ii) radio, (iii) print, (iv) internet, (v) three-dimensional architecture and interior design, (vi) fragrance, (vii) taste tests, (viii) use tests, etc.

As utilized herein, including the claims, the term "motivation," means the ability to engender engagement so as to compel an increase in acceptance. Whereas affiliation is related to valence, motivation relates to the potency, arousal level or impact which the stimulus has upon the participant.

As utilized herein, including the claims, the phrase "same type of goods or services," means goods or services which would be listed under the same topic heading in the most current US West Dex® Yellow Pages directory relative to the date of inquiry as to whether the goods or services are of the same type.

The Method

The method is a rigorous and accurate automated method of assessing target audience reaction to a business stimulus utilizing facial coding (e.g., FACS) and a unique scoring system for determining the extent to which consumers are impacted by a business stimulus and whether such impact was favorable or unfavorable in relation to business objectives. Such a presentation of a target audience's reaction facilitates the use of such data in making business decisions.

The method enables businesses and organizations to gain a better understanding of their target audiences' sensory and emotional experiences or take-away impressions to business stimuli by providing them with psycho-physiological facial coding assessments of the affiliation and motivation value of the business stimuli. The business stimuli can be placed within a company-based comparative or even directly competitive context when desired. Use of the method with competing business stimuli can be evaluated, providing not only a summary of physiological responses but also a comparison between two summaries, revealing subtle differences. Use of the method enhances the ability of a company to tailor product and marketing efforts to existing and prospective customers, and tailor work-place enhancement efforts.

The method possesses several advantages, including: (1) the ability to capture the subtle, otherwise undetectable ways in which our bodies register and reflect our thoughts and emotions, (2) the ability to capture subconscious physiological responses to stimuli beyond what might be otherwise consciously known and verbally acknowledged, (3) the ability to practice real-time and frame-by-frame assessment of responses during the initial experience of a stimulus and/or during a subsequent interview, (4) the ability to conduct the study in an unobtrusive and non-invasive manner, and (5) an objective based scientific system for monitoring emotional responses which is more accurate and precise than subjective reports.

The method can be usefully and successfully employed in connection with a wide variety of different media including specifically, but not exclusively, television programming, television advertising, radio programming, radio advertising, movie trailers, phone messaging systems, customer service dynamics, signage, uniforms, vehicles, offering designs, print ads, direct mail, product packaging and design (including visual and tactile), point of purchase displays, actual packaged or unpackaged products, taste and/or smell tests for products and/or services, store environments, corporate lobbies, logos, brand names, taglines, catalogs, entire web sites, individual web pages, work-station size, configuration and placement, Power Point™ presentations, meetings, company announcements, company strategies, pricing, etc.

Generally, a subject is recruited for participation as a member of a sample population, sometimes after responding appropriately to several qualification questions (e.g., are they a member of the product target market). The session is recorded by a video camera positioned to ensure that high quality images of the participant's facial expressions are obtained throughout the session. The video camera can conveniently be mounted atop a computer monitor upon which the business stimuli will likely be presented. Other options are to mount the camera on the table or desktop in front of the participant, mounted within a store for viewing customers as they shop, hand-held, and images provided over a mobile phone held or mounted by the subject. When the sessions involves an interaction between the participant and an interviewer, or other form of guided test, the participant should be instructed to (i) look into the camera when answering questions, (ii) avoid any extreme or radical head movement during the session, and (iii) keep from touching their face during the session.

The participant is then exposed to the business stimuli. When exposure is guided, the participant will most often be exposed to the business stimuli one at a time, preferably in a randomized order using a preprogrammed test procedure, and can be asked one or more questions about the business stimuli immediately after each exposure (i.e., interviewed), in order to gauge the participant's emotional response to each business stimulus, interest in purchasing product or services and/ or development of brand loyalty. When exposure is guided, the individual controlling the testing procedure (not shown)

has the business stimuli prepared and obscured until needed. Care is taken to ensure that the procedure of presenting and removing the business stimuli does not distract or inhibit the participant's natural responses to the experience.

When exposure is unguided, the participant is simply permitted to experience the business stimuli in a natural and unguided manner, with passive camera monitoring of the participant's interaction with the stimuli.

Upon completion of the session (i.e., exposure to the entire collection of business stimuli and all interview inquiries, ratings, and/or exercises completed) the videotape is shut off (manually or automatically) and the participant dismissed. Preferably, the session is repeated for about 10 to 200, preferably about 20 to 100 participants.

The videotape of pertinent portions of the session is then analyzed by software having facial feature tracking capabilities whereby expressional repositioning of selected facial features by the participant in the videotape can be automatically detected and recorded. Software possessing such capabilities is commercially available from Neven Vision, Inc. of Santa Monica, Calif. under the designations ffT™ (facial feature tracking). A preferred set of facial features suitable for tracking by the ffT™ facial feature tracking software and allowing the detection of FFMs suitable for coding to AUs, Emotions, Emotional Values and an Affiliation Value and a Motivation Value (A&M Values) are described in Table Two below and depicted in FIG. 1.

TABLE TWO

FACIAL FEATURES

| FACIAL FEATURE NUMBER | LOCATION DESCRIPTION |
|---|---|
| FF1 | Outer Edge of Brow |
| FF2 | Middle of Brow |
| FF3 | Inner Edge of Brow |
| FF4 | Outer Edge of Eye |
| FF5 | Vertically Aligned Set on the Horizontal Center of the Lower Eyelid Fold and the Horizontal Center of the Upper Eyelid Fold |
| FF6 | Inside Edge of Eye |
| FF7 | Bridge of Nose |
| FF8 | Tip of Nose |
| FF9 | Lateral Sides of Nose |
| FF10 | Area Below Each Nostril |
| FF11 | Outside Edges of Mouth |
| FF12 | Left and Right Medial Points on Upper Lip |
| FF13 | Center of Upper Lip |
| FF14 | Left and Right Medial Points on Lower Lip |
| FF15 | Outside Edge at Center of Lower Lip |
| FF16 | Inside Edge at Center of Upper Lip and Inside Edge at Center of Lower Lip |

The software conducts a computerized comparison of the facial position of each of the selected facial features through sequential facial images and automatically codes contemporaneously detected and recorded expressional repositionings to at least one of an Action Unit, one or more Emotions and Emotional Values, or a combination of an Affiliation Value and a Motivation Value (A&M Values) in accordance with a coding and translation system such as the specific coding system set forth below.

Optionally, but preferably, the software notes the timed location of any detected smile (i.e., facial expression involving upward and outward movement of one or both corners of mouth (nodes 11)) so that a trained individual can quickly locate occurrences of a smile on the videotape, manually view the smile, categorize the smile as a positive social smile (i.e., smile accompanied by laughter which translated to joy), a neutral social smile (i.e., smile accompanied by a positive or neutral comment which translates to a social smile) or a negative smile (i.e., a smile accompanied by a negative or sarcastic comment which translates to skepticism), and input such categorization data into the computer system for use in tabulating coded results.

Coding

Detected and reported FFMs are automatically coded to AUs by a computer in accordance with a predetermined code, such as that set forth in Table Three.

TABLE THREE

CODING OF FACIAL FEATURE MOVEMENT (FFM) TO AU

| ACTION UNIT | FACIAL FEATURE MOVEMENT | |
|---|---|---|
| | NUMBER | DIRECTION |
| AU1 | FF3 | Up |
| AU2 | FF1 | Up |
| AU4 | FF2 and/or | Down |
| | FF3 | In |
| AU5 | FF5 | Apart |
| AU6 | FF 1 and/or | Down |
| | FF5[1] | Together |
| AU7 | FF5[1] | Together |
| AU9 | FF9 or | Up & Out |
| | FF9 & FF12 | Up/Up |
| AU10 | FF 10 and/or | Wider |
| | FF12 | Up |
| AU11 | FF10 | Wider |
| AU12U (one) | FF11 | Up & Out |
| AU12F (both) | FF11 | Up & Out |
| AU14 | FF11 and | Slight Out & Down |
| | FF16 | Tighter |
| AU15 | F11 | Down |
| AU16 | FF14 and | Down |
| | FF15 | Down |
| AU17 | FF13 and | Up |
| | FF15 | Up |
| AU20 | FF 10 and/or | Down & Out |
| | FF11 | Down & Wider |
| AU22 | FF11 and | Closer |
| | FF16 | Wider |
| AU23 | FF11 and | Closer |
| | FF16 | Tighter |
| AU24 | FF16 | Tighter |
| AU26 | FF16 | Wider |
| AU27 | FF 11 and | Closer |
| | FF16 | Widest |

[1]Movement of FF5 together codes to an AU7 unless accompanies by a contemporaneous AU12F or AU12U.

Detection and coding of FFMs to AUs during verbalization of responses is preferably limited to AUs 5, 6, 7, 9 and 12.

Translating

Coded AUs are automatically translated to Emotions and Emotional Values by a computer in accordance with a predetermined correlation system, such as that set forth in Table Four. Since AU12F can translate for more than one set of Emotions and Emotional Values, additional information is required. When accompanied by contemporaneous laughter in the absence of a negative or sarcastic comment, the AU12F is evaluated as an AU12L and translates as set forth in Table Four. When accompanied by a contemporaneous positive or neutral comment the AU12F is evaluated as an AU12P and translates as set forth in Table Four. Finally, when accompanied by a contemporaneous negative or sarcastic comment the AU12F is evaluated as an AU12N and translates as set forth in Table Four. The additional information necessary to determine whether a coded AU12F translates as an AU12L, an AU12P or an AU12N can be manually inputted into the computer by a trained individual after viewing that segment of the videotape corresponding to the coded AU12F and observing whether the AU12F is accompanied by the components of laughter, a positive or neutral comment or a negative or sarcastic comment. In the total absence of contemporaneous laughter or comment, an AU12F translates to an AU12P.

TABLE FOUR

CORRELATION OF AUS TO EMOTION(S)

| ACTION UNIT | EMOTION TYPE | WEIGHTED VALUE |
|---|---|---|
| AU1 | Fear | 0.25 |
|  | Sadness | 0.25 |
|  | Surprise | 0.50 |
| AU2 | Fear | 0.33 |
|  | Surprise | 0.66 |
| AU4 | Anger | 0.33 |
|  | Fear | 0.33 |
|  | Sadness | 0.33 |
| AU5 | Anger | 0.33 |
|  | Fear | 0.33 |
|  | Surprise | 0.33 |
| AU6 | Sadness | 1.00 |
| AU6 + AU12 | True Smile | 1.50 |
| AU7 | Anger | 1.00 |
| AU9 | Disgust | 1.50 |
| AU10 | Anger | 0.50 |
|  | Disgust | 1.00 |
| AU10 + AU14 | Anger | 0.25 |
|  | Disgust | 1.25 |
| AU11 | Sadness | 1.00 |
| AU12U | Micro smile | 1.00 |
| AU12L[1] | Joy | 1.00 |
| AU12P[2] | Social smile | 1.00 |
| AU12N[3] | Skepticism | 1.00 |
| AU14 | Disgust | 1.00 |
| AU15 | Disgust | 0.50 |
|  | Sadness | 0.50 |
| AU16 | Disgust | 1.00 |
| AU17 | Anger | 0.33 |
|  | Disgust | 0.33 |
|  | Sadness | 0.33 |
| AU20 | Fear | 1.00 |
| AU22 | Anger | 1.00 |
| AU23 | Anger | 1.00 |
| AU24 | Anger | 1.00 |
| AU26 | Anger | 0.20 |
|  | Fear | 0.20 |
|  | Disgust | 0.20 |
|  | Sadness | 0.20 |
|  | Surprise | 0.20 |
| AU27 | Fear | 0.50 |
|  | Surprise | 0.50 |

[1] AU12L is AU12F with contemporaneous laughter in the absence of a negative or sarcastic comment.
[2] AU12P is AU12F with a contemporaneous positive or neutral comment, or the absence of any comments.
[3] AU12N is AU12F with a contemporaneous negative or sarcastic comment, even if accompanied by laughter.

Alternatively, the computer can be programmed to bypass the step of coding FFMs to AUs, and simply code the FFMs directly to Emotions and Emotional Values since this correlation is known.

Translated Emotions and Emotional Values may be further translated into A&M Values by a computer in accordance with a predetermined correlation system, such as that set forth in Table Five.

The Emotional Values and A&M Values may optionally be increased by an intensity factor based upon the duration of the underlying FFM which coded for the Emotional Value and A&M Value. For example, the Emotional Values and A&M Values may remain unchanged (i.e., multiplied by an intensity factor of 1) when the duration of the underlying FFM is short ($\leq$3/30th of a second), increased by a factor of 2 when the duration of the underlying FFM is moderate (>3/30th of a second but <5/30th of a second), or increased by a factor of 3 when the duration of the underlying FFM is long ($\geq$5/30th of a second).

In order to prevent a few "overly expressive" participants from flooding the data pool and thereby monopolizing the final results, the Emotional Values and A&M Values are preferably scaled for each participant so that each participant contributes the same weighted value to the total. One convenient method of achieving this goal is to determine the percentage of each Emotion Value for each participant based upon that participants total Emotional Value for all Emotions, and utilize the percentage for each Emotional Value from each participant in any further evaluation of group Emotional Values and/or group A&M Values.

TABLE FIVE

CORRELATION OF EMOTION(S) TO A & M VALUES

| EMOTION | A & M COEFFICIENTS | |
|---|---|---|
|  | AFFILIATION | MOTIVATION |
| Anger | −0.51 | 0.59 |
| Disgust | −0.41 | 0.33 |
| Fear | −0.64 | 0.60 |
| Joy | 0.81 | 0.51 |
| Sadness | −0.63 | −0.27 |
| Skepticism | −0.22 | 0.21 |
| Surprise | 0.40 | 0.67 |
| Micro Smile | 0.55 | 0.07 |
| Social Smile | 0.61 | 0.10 |
| True Smile | 0.76 | 0.48 |

Alternatively, the computer can be programmed to bypass the step of coding FFMs to AUs and/or translating coded AUs to Emotions and Emotional Values and simply code FFMs directly to A&M Values since this correlation is known.

Reporting

A number of reporting options exists for representing the data. Briefly, the Emotional Values and/or A&M Values may be reported for each participant, segmented groups of the participants (e.g., men v. women or those who had purchased the advertised product before v. those who had not purchased the advertised product before) or all participants. The Emotional Values and/or A&M Values may also be reported at selected time intervals (e.g., every second), at selected points in the session (e.g., one report during viewing of the stimulus and another report in response to one or more specific questions during the interview), or the entire session. Several exemplary options of specific types of reports include specifically, but not exclusively, (i) reporting the data separately for each individual stimuli, (ii) reporting the data for a plurality of stimuli in comparative form, (iii) reporting the data separately for each member of the sample population, (iv) graphically reporting the average affiliation and motivation values with each score forming an axis of the graph, (v) graphically reporting the average affiliation and motivation values for only a selected portion of the exposure period (e.g., the first six seconds of exposure to the business stimuli, the reaction to a specific question, etc.), (vi) graphically reporting the average affiliation and motivation values for a plurality of distinct portions of the exposure period together on the same graph (e.g., scores during exposure to the business stimuli and scores during questioning), (vii) graphically reporting the affiliation and motivation values for each participant to ascertain the distribution of the participants, (viii) graphically reporting, in a pie chart or bar graph format, the percentage of each emotional value to a related stimulus, etc. One report of particular interest is a second-by-second report of Emotional Values and/or A&M Values throughout a television commercial.

EXAMPLES

Example 1

Participants A-E are each exposed to two stimuli, asked one question immediately after viewing each stimulus, and asked a second question later regarding the ability of the stimulus to induce enhanced purchase likelihood. The faces of the participants are videotaped during the exposure and interview periods specifically related to the questions. The videotape of each participant is analyzed using ffT™ facial feature tracking software. The facial feature movements (FFM) listed in Table Six are detected and reported. The duration of each detected FFM is determined, categorized as short ($\leq$1/30th of a second), moderate (>1/30th of a second but <3/30th of a second) or long ($\geq$3/30th of a second). The software tags or reports the location of each detected movement involving FF12 on each videotape. A trained individual reviews the tagged location of each FF11 related portion of videotape and inputs data into the computer indicating the observation of any laughter, positive or neutral comment or a negative or sarcastic comment accompanying movement of FF12.

The computer codes the detected FFMs, along with any associated data input by the trained individual, into Action Units (AU) as shown in Table Six. The coded AUs are then correlated to weighted Emotional Values and Affiliation and Motivation Values (A&M Values) as shown in Tables Seven (A) and (B) (Emotional Values) and Eight (A&M Values). The computer multiplies each correlated Emotional Value—and thereby inherently multiplies the derived A&M Values—by the corresponding intensity factor to obtain enhanced values. The categorized tally of enhanced Emotional Values and enhanced A&M Values for each stimulus is set forth in the final rows of Tables Seven (A) and (B) (Emotional Values) and Eight (A&M Values).

The relative percentages of the tallied value of each emotion for each stimulus, and the averaged A&M Values (averaged for number of coded AUs) for each stimulus is automatically calculated and reported, again as shown in Tables Seven (A) and (B) (Emotional Values) and Eight (A&M Values).

TABLE SIX

| PARTICIPANT | FFM | INTENSITY CATEGORY | OBSERVATION DATA | AU |
|---|---|---|---|---|
| STIMULUS ONE | | | | |
| A | FF3 Up | Low | | AU1 |
|  | FF2 Down | Low | | AU4 |
|  | FF9 Up & Out | Moderate | | AU9 |
| B | FF3 Up | Low | | AU1 |
|  | FF11 Up & Out | Low | Laughter | AU12L |
|  | FF16 Wider | Low | | AU22 |
| C | FF5 Together | Low | | AU7 |
|  | FF3 Up | Low | | AU1 |
|  | FF2 Down | Low | | AU4 |
|  | FF16 Wider | Low | | AU22 |
| D | FF2 Down | Low | | AU4 |
|  | FF5 Together | High | | AU7 |
|  | FF16 Wider | Low | | AU22 |
|  | FF16 Wider | Low | | AU22 |
|  | FF11 Up & Out | Moderate | Laughter | AU12L |
| E | FF5 Together | Low | | AU7 |
|  | FF2 Down | Low | | AU4 |
|  | FF5 Together | Moderate | | AU7 |
| STIMULUS TWO | | | | |
| A | FF16 Wider | Low | | AU22 |
|  | FF11 (one) Up & Out | Low | | AU12U |
|  | FF11 (both) Up & Out | Low | Negative Comment | AU12N |
| B | FF3 Up | Low | | AU1 |
|  | FF11 (both) Up & Out | Low | Sarcastic Comment | AU12N |
| C | FF16 Wider | Low | | AU22 |
|  | FF1 Down | Low | | AU6 |
| D | FF11 (one) Up & Out | Low | | AU12U |
|  | FF1 Up | Low | | AU2 |
| E | FF11 (one) Up & Out | Low | | AU12U |
|  | FF16 Widest | Low | | AU27 |
|  | FF11 (both) Up & Out | Low | Neutral Comment | AU12P |

TABLE SEVEN (A)

| PARTY | INTENSE FACTOR | AU | WEIGHTED EMOTIONS | | | | | | | | | |
|---|---|---|---|---|---|---|---|---|---|---|---|---|
| | | | Anger | Disgust | Fear | Joy | Sadness | Skeptic | Smile (micro) | Smile (Social) | Smile (True) | Surprise |
| STIMULUS ONE | | | | | | | | | | | | |
| A | 1 | AU1 | | | 0.25 | | 0.25 | | | | | 0.50 |
|  | 1 | AU4 | 0.33 | | 0.33 | | 0.33 | | | | | |
|  | 1.5 | AU9 | | 1.50 | | | | | | | | |
|  | Totals w/ Intensity | | 0.33 | 2.25 | 0.58 | 0 | 0.58 | 0 | 0 | 0 | 0 | 0.50 |
|  | % of All Emotions | | 7.9% | 52.9% | 13.7% | 0 | 13.7% | 0 | 0 | 0 | 0 | 11.8% |
| B | 1 | AU1 | | | 0.25 | | 0.25 | | | | | 0.50 |
|  | 1 | AU12L | | | | 1.00 | | | | | | |
|  | 1 | AU22 | 1.00 | | | | | | | | | |

TABLE SEVEN (A)-continued

| PARTY | INTENSE FACTOR | AU | Anger | Disgust | Fear | Joy | Sadness | Skeptic | Smile (micro) | Smile (Social) | Smile (True) | Surprise |
|---|---|---|---|---|---|---|---|---|---|---|---|---|
| | | Totals w/ Intensity | 1.00 | | 0.25 | 1.00 | 0.25 | | | | | 0.50 |
| | | % of All Emotions | 33.3% | 0 | 8.3% | 33.3% | 8.3% | 0 | 0 | 0 | 0 | 16.8% |
| C | 1 | AU7 | 1.00 | | | | | | | | | |
| | 1 | AU1 | | | 0.25 | | 0.25 | | | | | 0.50 |
| | 1 | AU4 | 0.33 | | 0.33 | | 0.33 | | | | | |
| | 1 | AU22 | 1.00 | | | | | | | | | |
| | | Totals w/ Intensity | 2.33 | 0 | 0.58 | 0 | 0.58 | 0 | 0 | 0 | 0 | 0.50 |
| | | % of All Emotions | 58.4% | 0 | 14.6% | 0 | 14.5% | 0 | 0 | 0 | 0 | 12.5% |
| D | 1 | AU4 | 0.33 | | 0.33 | | 0.33 | | | | | |
| | 3 | AU7 | 1.00 | | | | | | | | | |
| | 1 | AU22 | 1.00 | | | | | | | | | |
| | 1 | AU22 | 1.00 | | | | | | | | | |
| | 1.5 | AU12L | | | | 1.00 | | | | | | |
| | | Totals w/ Intensity | 5.33 | 0 | 0.33 | 1.50 | 0.33 | 0 | 0 | 0 | 0 | 0 |
| | | % of All Emotions | 71.2% | 0 | 4.4% | 20.0% | 4.4% | 0 | 0 | 0 | 0 | 0 |
| E | 1 | AU7 | 1.00 | | | | | | | | | |
| | 1 | AU4 | 0.33 | | 0.33 | | 0.33 | | | | | |
| | 1.5 | AU7 | 1.00 | | | | | | | | | |
| | | Totals w/ Intensity | 2.83 | 0 | 0.33 | 0 | 0.33 | 0 | 0 | 0 | 0 | 0 |
| | | % of All Emotions | 81.0% | 0 | 9.5% | 0 | 9.5% | 0 | 0 | 0 | 0 | 0 |
| TOTAL OF PARTICIPANT EMOTION | | | 251.8 | 52.9 | 50.5 | 53.3 | 50.4 | 0 | 0 | 0 | 0 | 41.1 |
| AVERAGE OF EMOTION % FOR PARTICIPANTS | | | 50.4% | 10.6% | 10.1% | 10.7% | 10.0% | 0 | 0 | 0 | 0 | 8.2 |

TABLE SEVEN (B)

| PARTY | INTENSE FACTOR | AU | Anger | Disgust | Fear | Joy | Sadness | Skeptic | Smile (micro) | Smile (Social) | Smile (True) | Surprise |
|---|---|---|---|---|---|---|---|---|---|---|---|---|
| | | | | | STIMULUS TWO | | | | | | | |
| A | 1 | AU22 | 1.00 | | | | | | | | | |
| | 1 | AU12U | | | | | | | | 1.00 | | |
| | 1 | AU12N | | | | | | 1.00 | | | | |
| | | Totals w/Intensity | 1.00 | 0 | 0 | 0 | 0 | 1.00 | 1.00 | 0 | 0 | 0 |
| | | % of All Emotions | 33.3% | 0 | 0 | 0 | 0 | 33.3% | 33.3% | 0 | 0 | 0 |
| B | 1 | AU1 | | | 0.25 | | 0.25 | | | | | 0.50 |
| | 1 | AU12N | | | | | | 1.00 | | | | |
| | | Totals w/Intensity | 0 | 0 | 0.25 | 0 | 0.25 | 1.00 | 0 | 0 | 0 | 0.50 |
| | | % of All Emotions | 0 | 0 | 12.5% | 0 | 12.5% | 50.0% | 0 | 0 | 0 | 25.0% |
| C | 1 | AU22 | 1.00 | | | | | | | | | |
| | 1 | AU6 | | | | | 1.00 | | | | | |
| | | Totals w/Intensity | 1.00 | 0 | 0 | 0 | 1.00 | 0 | 0 | 0 | 0 | 0 |
| | | % of All Emotions | 50.0% | 0 | 0 | 0 | 50.0% | 0 | 0 | 0 | 0 | 0 |
| D | 1 | AU12U | | | | | | | 1.00 | | | |
| | 1 | AU2 | | | 0.33 | | | | | | | 0.66 |
| | | Totals w/Intensity | 0 | 0 | 0.33 | 0 | 0 | 0 | 1.00 | 0 | 0 | 0.66 |
| | | % of All Emotions | 0 | 0 | 16.6% | 0 | 0 | 0 | 50.2% | 0 | 0 | 33.2% |
| E | 1 | AU12U | | | | | | | 1.00 | | | |
| | 1 | AU27 | | | 0.50 | | | | | | | 0.50 |
| | 1 | AU12P | | | | | | | | 1.00 | | |
| | | Totals w/Intensity | 0 | 0 | 0.50 | 0 | 0 | 0 | 1.00 | 1.00 | 0 | 0.50 |
| | | % of All Emotions | 0 | 0 | 16.7% | 0 | 0 | 0 | 33.3% | 33.3% | 0 | 16.7% |
| TOTAL OF PARTICIPANT EMOTION % | | | 83.3 | 0 | 45.8 | 0 | 62.5 | 83.3 | 116.8 | 33.3 | 0 | 74.9 |
| AVERAGE OF EMOTION % FOR PARTICIPANTS | | | 16.7% | 0 | 9.2% | 0 | 12.5% | 16.7% | 23.3% | 6.6% | 0 | 15.0% |

TABLE EIGHT

| TYPE | EMOTIONS AVERAGE % FOR PARTICIPANTS | A & M COEFFICIENTS AFFILIATION | A & M COEFFICIENTS MOTIVATION | A & M VALUES AFFILIATION | A & M VALUES MOTIVATION |
|---|---|---|---|---|---|
| STIMULUS ONE | | | | | |
| Anger | 50.4 | −0.51 | 0.59 | −0.26 | 0.30 |
| Disgust | 10.6 | −0.41 | 0.33 | −0.04 | 0.03 |
| Fear | 10.1 | −0.64 | 0.60 | −0.06 | 0.06 |
| Joy | 10.7 | 0.81 | 0.51 | 0.08 | 0.05 |
| Sadness | 10.0 | −0.63 | −0.27 | −0.06 | −0.03 |
| Skepticism | 0 | −0.22 | 0.21 | 0 | 0 |
| Surprise | 8.2 | 0.40 | 0.67 | 0.03 | 0.05 |
| Micro Smile | 0 | 0.55 | 0.07 | 0 | 0 |
| Social Smile | 0 | 0.61 | 0.10 | 0 | 0 |
| True Smile | 0 | 0.76 | 0.48 | 0 | 0 |
| TOTALS | | | | −0.31 | 0.46 |

| TYPE | EMOTIONS TOTALS OF PARTICIPANT % | A & M COEFFICIENTS AFFILIATION | A & M COEFFICIENTS MOTIVATION | A & M VALUES AFFILIATION | A & M VALUES MOTIVATION |
|---|---|---|---|---|---|
| STIMULUS TWO | | | | | |
| Anger | 16.7 | −0.51 | 0.59 | −0.09 | 0.10 |
| Disgust | 0 | −0.41 | 0.33 | 0 | 0 |
| Fear | 9.2 | −0.64 | 0.60 | −0.06 | 0.05 |
| Joy | 0 | 0.81 | 0.51 | 0 | 0 |
| Sadness | 12.5 | −0.63 | −0.27 | −0.08 | −0.03 |
| Skepticism | 16.7 | −0.22 | 0.21 | −0.04 | 0.04 |
| Surprise | 15.0 | 0.40 | 0.67 | 0.06 | 0.10 |
| Micro Smile | 23.3 | 0.55 | 0.07 | 0.13 | 0.02 |
| Social Smile | 6.6 | 0.61 | 0.10 | 0.04 | 0.01 |
| True Smile | 0 | 0.76 | 0.48 | 0 | 0 |
| TOTALS | | | | −0.04 | 0.29 |

Conclusions: Participant reaction to stimulus one shows a strong adverse reaction to the stimulus. In other words, the response may be characterized as a "poison pill" giving significant arousal (i.e., motivation) but a decidedly adverse response based upon the negative affiliation score. Anger is clearly the most prevalent response and all positive reactions combined account for less than 20% of the reaction. In contrast, the response to stimulus two is essentially one of ambivalence. The reaction is slightly more negative than positive overall. The motivation score shows a lack of engagement, while the affiliation score is all but neutral. The fact that the tepid micro-smile category was the most common response to stimulus two shows the unlikelihood of this stimulus to make a marked difference in the business climate.

The specification is provided to aid in the complete non-limiting understanding of the invention. Since many variations and embodiments of the invention may be created and devised without departing from the spirit and scope of the invention, the scope of the invention resides in the claims hereinafter appended.

I claim:

1. A method of assessing reaction to a stimulus, comprising:
    (a) receiving a visual recording stored on a computer-readable medium of facial expressions of a human subject as the subject is exposed to a business stimulus or interview so as to generate a chronological sequence of recorded facial images;
    (b) accessing the computer-readable medium for automatically tracking expressional repositioning of each of a plurality of individual facial features by conducting a computerized comparison of the facial position of each facial feature through sequential facial images;
    (c) automatically analyzing the tracked expressional repositionings to identify regions on the subject's face where expressional repositioning is evident, and for each of one or more of the regions, determining one or more emotions exhibited by the subject based on the expressional repositionings in that region;
    (d) translating the emotions into one or more weighted values indicating at least one of the appeal of the stimulus to the subject and the impact the stimulus had on the subject.

2. The method of claim 1 wherein analyzing in step (c) comprises coding contemporaneously tracked expressional repositionings to action units.

3. The method of claim 1 wherein step (b) involves tracking expressional repositioning of at least ten facial features.

4. A computerized method of assessing reaction to a stimulus, comprising:
    (a) receiving a visual recording stored on a computer-readable medium of facial expressions of a human subject as the subject is exposed, over a period of time, to a business stimulus or interview so as to generate a chronological sequence of recorded facial images;
    (b) accessing the computer-readable medium for automatically tracking, over an exposure period of the recorded period of time, expressional repositioning of each of a plurality of individual facial features by conducting a computerized comparison of the facial position of each facial feature through sequential facial images;

(c) automatically analyzing the tracked expressional repositionings to identify regions on the subject's face where expressional repositioning is evident, and for each of one or more of the regions, determining one or more emotions exhibited by the subject at any given moment of the exposure period;

(d) translating the emotions into one or more weighted values indicating at least one of the valence of the stimulus to the subject and the potency the stimulus had on the subject;

(e) repeating steps (a) through (d) for each human subject member of a sample population comprised of a plurality of members; and (f) tallying one or more of the emotions and weighted values to determine the affect of the business stimulus on the sample population throughout any portion of the exposure period.

5. The method of claim 1, wherein the one or more weighted values may be adjusted based on the duration of one or more of the expressional repositionings.

6. A method of assessing reaction to a stimulus, comprising:
(a) receiving a visual recording stored on a computer-readable medium of facial expressions of a human subject as the subject is exposed, over a period of time, to a business stimulus or interview so as to generate a chronological sequence of recorded facial images;
(b) accessing the computer-readable medium for automatically tracking, over an exposure period of the recorded period of time, expressional repositioning of each of a plurality of individual facial features by conducting a computerized comparison of the facial position of each facial feature through sequential facial images;
(c) automatically analyzing the tracked expressional repositionings to identify regions on the subject's face where expressional repositioning is evident, and for each of one or more of the regions, using a scoring system to determine, for any given moment of the recorded exposure, one or more weighted values indicating at least one of the extent to which the stimulus impacted the subject and whether the impact was favorable or unfavorable;
(d) repeating steps (a) through (c) for each human subject member of a sample population comprised of a plurality of members; and
(e) tallying the one or more weighted values to determine the affect of the business stimulus on the sample population throughout any portion of the exposure period.

7. A method of assessing reaction to a stimulus, comprising:
(a) receiving a visual recording stored on a computer-readable medium of facial expressions of a human subject as the subject is exposed to a business stimulus or interview so as to generate a chronological sequence of recorded facial images;
(b) accessing the computer-readable medium for automatically detecting and recording expressional repositioning of each of a plurality of selected facial features by conducting a computerized comparison of the facial position of each selected facial feature through sequential facial images;
(c) automatically coding contemporaneously detected and recorded expressional repositionings to at least one action unit, wherein at least one of the at least one action units is translated to a plurality of weighted emotions;
(d) repeating steps (a) through (c) for each human subject member of a sample population comprised of a plurality of members; and
(e) tallying the weighted emotions from the plurality of members over a given time period along with an identification of the business stimulus to which the subjects were exposed during that given time period.

8. The method of claim 1 further comprising (e) repeating steps (a) through (d) for each human subject member of a sample population comprised of a plurality of members and (f) tallying one or more of the emotions, emotional values, and weighted values from the plurality of members to determine the affect of the business stimulus on the sample population.

9. The method of claim 8 further comprising reporting a time line indicating at least one or more of the emotions, emotional values, and weighted values corresponding to particular time intervals in the timeline.

10. The method of claim 1, wherein step (c) further comprises determining an emotional value for each of the one or more emotions exhibited by the subject, and wherein translating the emotions into one or more weighted values in step (d) comprises translating the emotions and corresponding emotional values into one or more weighted values.

11. The method of claim 10 further comprising automatically recording the duration of the tracked expressional repositionings, wherein the emotional values are weighted based at least in part on the duration of the corresponding expressional repositionings.

12. A method of assessing reaction to a stimulus, comprising:
(a) receiving a series of images stored on a computer-readable storage medium of facial expressions of a human subject in response to exposure to a business stimulus or interview;
(b) accessing the series of images from the computer-readable storage medium to assign feature tracking points to each of a plurality of facial muscle locations;
(c) automatically tracking the plurality of tracking points through sequential facial images;
(d) automatically identifying changes in the positioning of at least one of the tracking points through sequential facial images and based on the identified changes, determining changes to one or more action units pertaining to the identified changes; and
(e) translating each of the changes to the one or more action units into one or more emotions and a weighted emotional value for each of the one or more emotions.

13. The method of claim 12, wherein the action units are FACS action units.

14. The method of claim 12, wherein the action units are EMFACS action units.

15. The method of claim 12, wherein the facial muscle locations correspond to one or more facial features.

16. The method of claim 15, wherein the one or more facial features include at least one of the subjects' eyebrows, eyes, nose, mouth, and chin and wherein changes in the positioning of at least one of the tracking points correlate to changes in the positioning of the one or more facial features.

17. The method of claim 16, wherein the changes in the positioning of the one or more facial features comprise directional changes of the one or more facial features, a directional change comprising at least one of a direction and angle.

18. The method of claim 17, wherein the action units are EMFACS action units.

19. The method of claim 12, wherein the changes in the positioning of at least one of the tracking points comprise directional changes of the one or more tracking points, a directional change comprising at least one of a direction and angle.

20. The method of claim 12, wherein the changes in the positioning of at least one of the tracking points correlates to directional changes of the respective facial muscle locations, a directional change comprising at least one of a direction and angle.

21. The method of claim 12, further comprising (f) translating the one or more emotions into one or more translated values indicating at least one of the appeal of the stimulus to the subject and the impact the stimulus had on the subject.

22. The method of claim 12, further comprising (f) translating the one or more emotions and corresponding weighted emotional values into one or more translated values indicating at least one of the appeal of the stimulus to the subject and the impact the stimulus had on the subject.

23. The method of claim 22, wherein the one or more emotions and corresponding weighted emotional values are translated into one or more translated values indicating the appeal of the stimulus to the subject and the impact the stimulus had on the subject.

24. The method of claim 22, further comprising reporting the translated values as positive or negative values.

25. The method of claim 12, wherein at least one of the weighted emotional values is adjusted based on the duration of one or more of the identified changes.

26. The method of claim 12 further comprising reporting a timeline indicating at least one or more of the action units, emotions, and emotional values corresponding to particular time intervals in the timeline.

27. The method of claim 22 further comprising reporting a timeline indicating the translated values corresponding to particular time intervals in the timeline.

28. The method of claim 12, wherein at least one of the weighted emotional values is adjusted based on the intensity of one or more of the identified changes.

29. The method of claim 12, wherein at least one of the emotions is adjusted based on a contextual review of the occurrence of one or more of the identified changes.

30. A method of assessing reaction to a stimulus, comprising:
(a) receiving a series of images stored on a computer-readable medium of facial expressions of a human subject in response to exposure to a business stimulus or interview;
(b) accessing the series of images from the computer-readable storage medium to assign feature tracking points to each of a plurality of facial feature locations;
(c) automatically tracking the plurality of tracking points through sequential facial images;
(d) automatically identifying changes in the positioning of at least one of the tracking points through sequential facial images; and
(e) translating the identified changes into one or more emotions and a weighted emotional value for each of the one or more emotions informed by relationships determined in EMFACS.

31. The method of claim 30, wherein the one or more facial feature locations are proximate to at least one of the subjects' eyebrows, eyes, nose, mouth, and chin and wherein changes in the positioning of at least one of the tracking points correlate to changes in the positioning of one or more of the subjects' eyebrows, eyes, nose, mouth, and chin.

32. The method of claim 30, wherein the changes in the positioning of the one or more facial feature locations comprise directional changes of the one or more facial feature locations, a directional change comprising at least one of a direction and angle.

33. The method of claim 30, wherein the changes in the positioning of at least one of the tracking points comprise directional changes of the one or more tracking points, a directional change comprising at least one of a direction and angle.

34. A method of assessing reaction to a stimulus, comprising:
(a) receiving a series of images stored on a computer-readable medium of facial expressions of a human subject in response to exposure to a business stimulus or interview;
(b) accessing the series of images from the computer-readable storage medium to automatically track, through sequential facial images, expressional repositionings to identify a region on the human subject's face where expressional repositioning is evident; and
(c) translating the identified region into one or more emotions and a weighted emotional value for each of the one or more emotions informed by relationships determined in FACS.

35. A method of assessing reaction to a stimulus, comprising:
(a) receiving a series of images stored on a computer-readable medium of facial expressions of a human subject in response to exposure to a business stimulus or interview;
(b) accessing the series of images from the computer-readable storage medium to automatically track, through sequential facial images, expressional repositionings to identify a region on the human subject's face where expressional repositioning is evident; and
(c) translating the identified region into one or more emotions and a weighted emotional value for each of the one or more emotions informed by relationships determined in EMFACS.

36. The method of claim 8 further comprising repeating steps (a) through (f) for at least one other business stimulus or interview which is different from the first business stimulus, and visually comparing the tally for each business stimulus or interview.

37. The method of claim 36 wherein the business stimuli are of the same type.

38. The method of claim 36 wherein the business stimuli involve sales or marketing of the same type of goods or services.

39. The method of claim 8 wherein the sample population is comprised of between about 10 to 200 members.

40. The method of claim 8 wherein the sample population is comprised of between about 10 to 100 members.

41. The method of claim 8 wherein step (a) further comprises video recording the human subject.

* * * * *